L. J. Baker.

Scaffold.

Nº 62,806. Patented Mar. 12, 1867.

Witnesses:
A. McNichol
Enoch S D Crosby

Inventor:
Loring J Baker

United States Patent Office.

LORING J. BAKER, OF EAST MACHIAS, MAINE.

Letters Patent No. 62,806, dated March 12, 1867; antedated March 1, 1867.

IMPROVED CLIMBING STAGE.

*The Schedule referred to in these Letters Patent and making part of the same.*

TO ALL WHOM IT MAY CONCERN:

Be it known that I, LORING J. BAKER, of East Machias, in the county of Washington, and State of Maine, have invented an Improved Climbing Stage; and I do hereby declare that the following is a full and exact description of the same, reference being had to the accompanying drawings, and to the letters of reference marked thereon.

Nature.

The nature of my invention consists in an arrangement for assisting workmen in ascending telegraph poles.

To enable others skilled in the art to make and use my invention, I will proceed to describe its construction and use.

Drawings.

Figure 3:
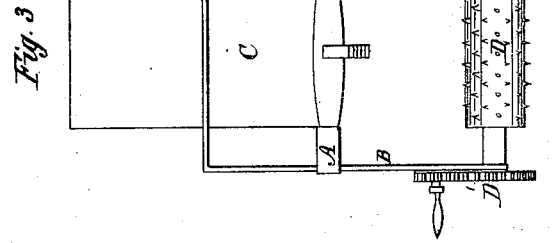
Figure 3 is a plan of the same.
Figure 2:
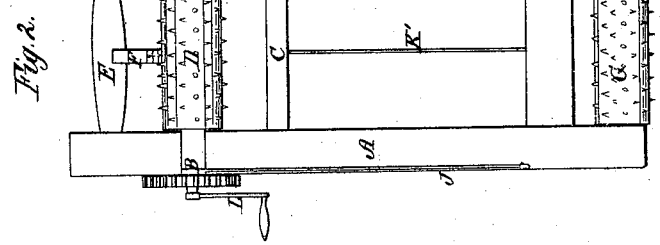
Figure 2 is a front elevation of the same.
Figure 1:
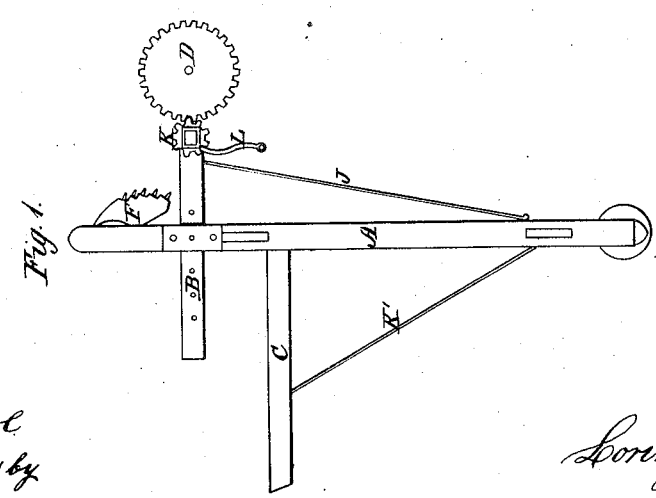
Figure 1 is a side elevation of my machine.

I make of good strong wood a frame, A A, as shown in drawings. In the base of this frame I hang the iron roller G, the surface of which is studded with sharp spikes, as shown. Near the top of the frame I fix, substantially as shown, the wrought-iron bars or arms B B in such a manner that they may be drawn out or pushed in, and may be held in any required position by means of the pin which passes through the frame and through holes, n n n, fig. 1, made in the bars. In the end of the bars B B I hang the roller D, the surface of which is thickly studded with spikes. To the end of the journal of the roller D I affix a spur gear-wheel, D', which is driven by the pinion K and crank L. E represents a rocker-shaft, to which is firmly fixed the cam F, the surface of which is partially studded with sharp spikes, as shown in figs. 1, 2, and 3. J J are rods of iron attached to the frame and to the bars B B for purpose of making the whole strong. C is a seat or platform upon which the person using my machine sits while ascending the pole. While the machine is in use the seat stands as shown in fig. 1, and is so held by the iron rod K', but when not in use it can be folded down against the frame.

Figure 4:
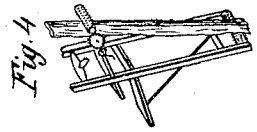
Figure 4 is a perspective view of my machine as it appears on a telegraph pole.

To use my climbing machine, I take the roller out of its bearings in B B, and thus placing the machine in relation to the pole as shown in fig. 4, replace the roller D and fasten it. Now, by getting upon the platform C and causing the roller D to revolve by means of the crank L and pinion K, the whole machine and the operator sitting upon it ascend the pole. When it is desired to stop, the operator can force the cam F against the pole and by slacking up on the crank allow the machine to settle slightly until the cam comes to a firm bearing upon the pole. It then becomes fixed, and the operator can go on with the work for which he has ascended the pole.

Claim.

What I claim as my invention, and desire to secure by Letters Patent, is—

The general construction and combination of the parts of a climbing machine, substantially as described and for the purpose set forth.

LORING J. BAKER.

Witnesses:
ARTEMAS FOSTER,
N. McNICHOL.